(12) United States Patent
Rada et al.

(10) Patent No.: US 7,522,569 B2
(45) Date of Patent: Apr. 21, 2009

(54) PERIPHERAL DEVICE WITH VISUAL INDICATORS TO SHOW UTILIZATION OF RADIO COMPONENT

(75) Inventors: Patrick Rada, San Jose, CA (US); Smiley Kuntjoro, Fremont, CA (US)

(73) Assignee: Netgear, Inc., San Jose, CA (US)

( * ) Notice: Subject to any disclaimer, the term of this patent is extended or adjusted under 35 U.S.C. 154(b) by 618 days.

(21) Appl. No.: 11/173,888

(22) Filed: Jun. 30, 2005

(65) Prior Publication Data
US 2007/0002846 A1 Jan. 4, 2007

(51) Int. Cl.
*H04W 4/00* (2006.01)
(52) U.S. Cl. .................................... 370/338
(58) Field of Classification Search ................ 370/338, 370/401, 400, 331–334
See application file for complete search history.

(56) References Cited
U.S. PATENT DOCUMENTS
6,621,029 B2 * 9/2003 Galmiche et al. .......... 200/600

OTHER PUBLICATIONS

Proxim Wireless Networks—Orinoco AP-2000 Access Point Family, 2003.*
U.S. Appl. No. 11/173,984, filed Jun. 30, 2005, Patrick Rada et al.
U.S. Appl. No. 29/233,436, filed Jun. 30, 2005, Larry Kerila et al.

* cited by examiner

*Primary Examiner*—Chirag G Shah
*Assistant Examiner*—Nima Mahmoudzadeh
(74) *Attorney, Agent, or Firm*—Wilson Sonsini Goodrich & Rosati

(57) ABSTRACT

An embodiment of the invention is directed to a network peripheral device. The network peripheral device includes a plurality of antennas, network communications electronics operable with the antennas, a plurality of electronically controllable visual indicators, and circuitry that activates the selected indicators. The network peripheral device may also include networking electronics, router functionality, a modem, a base band processor, a firewall, and/or a media access control (MAC) processor. The visual indicators may comprise light emitting diodes (LEDs). The visual indicators may correspond to a particular antenna. The visual indicators may also be arranged in a pattern corresponding to an arrangement of antennas in the plurality of antennas, or in a substantially circular pattern. Other embodiments of the invention are directed to various methods and devices.

22 Claims, 12 Drawing Sheets

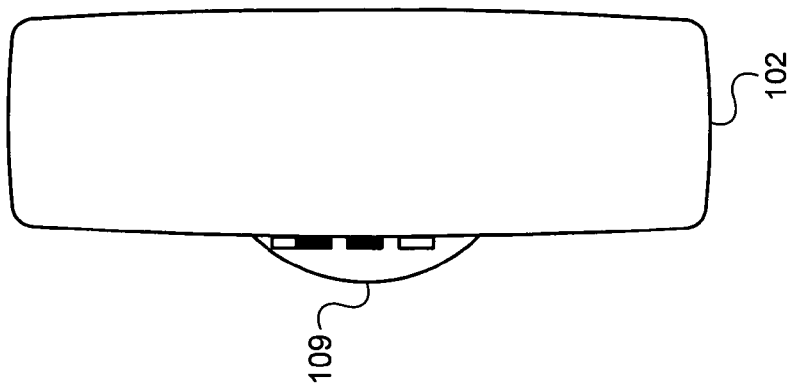
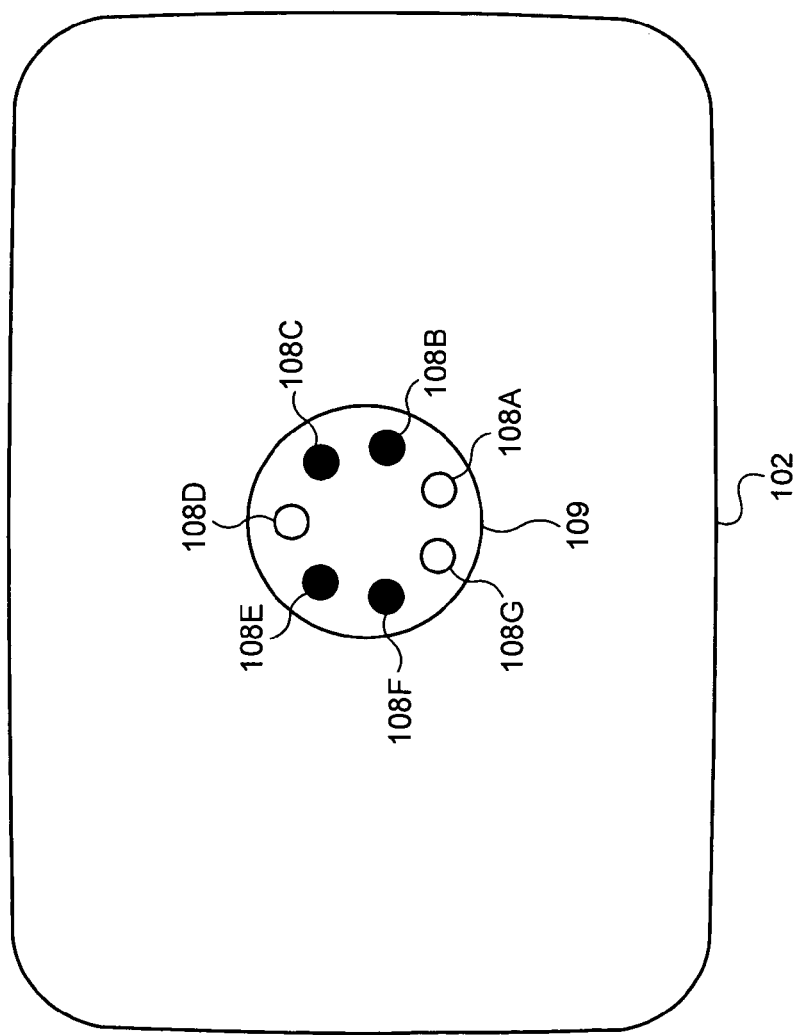
Figure 1C
Figure 1B

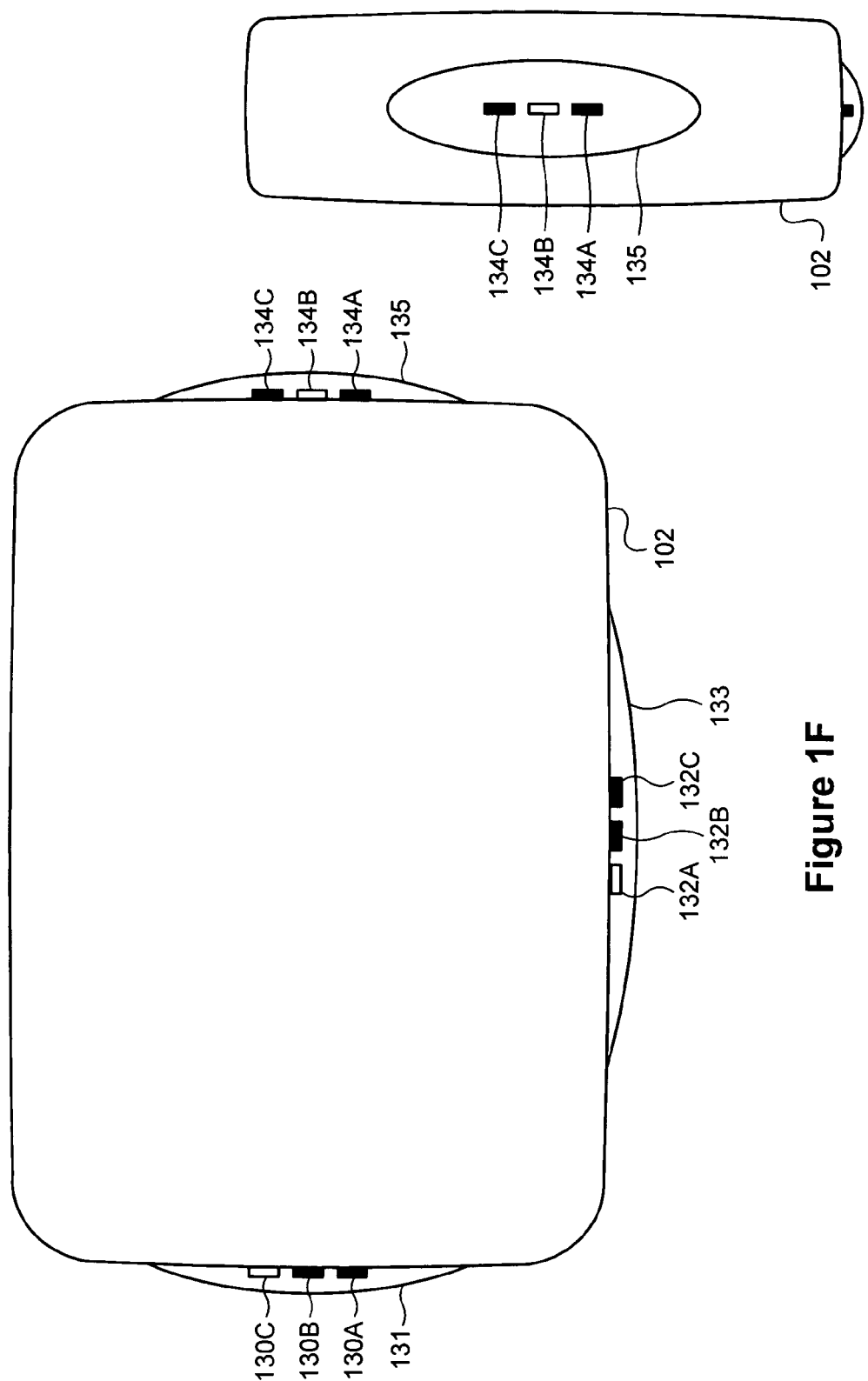

PERIPHERAL DEVICE WITH VISUAL INDICATORS TO SHOW UTILIZATION OF RADIO COMPONENT

CROSS-REFERENCE

This application is related to the following United States patent applications:

Utility patent application for Peripheral Device with Visual Indicators, Ser. No. 11/173,984, invented by Patrick Rada and Smiley Kuntjoro and filed Jun. 30, 2005; and Design patent application for Peripheral Device, Ser. No. 29/233,436, invented by Larry Kerila, Michelle Yu and Patrick Rada, filed Jun. 30, 2005.

Each of the foregoing applications are incorporated herein by reference in their entirety.

BACKGROUND OF THE INVENTION

As information processing, distribution and sharing through computers evolves, there is an increasing demand for networks and other forms of interconnectivity between computers. Users turn to solutions, such as network connections, wired and wireless, in order to provide increasing communication and availability of information. Some forms of networks, which may include local area networks (LANs), wide area networks (WANs), or a LAN/WAN and its internet service provider's network, may have network peripheral components that help to interconnect, or act as nodes for, or access points for, the computers or other devices to the applicable network. Such network peripheral components may comprise routers, modems, firewalls, or other components. A router is a device that forwards data along networks. A modem enables a computer to transmit data over, for example, telephone or cable lines. A firewall provides for some security, as they are frequently used to prevent unauthorized Internet users from accessing private networks connected to the Internet, especially intranets, and can be implemented in both hardware and software, or a combination of both.

As the use of network peripheral components proliferates, more users will be called upon to install, maintain, and support such components. These users may encounter problems in understanding and operating such components.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIG. 1B and FIG. 1C are front and side view diagrams, respectively, of a computer network peripheral device with a plurality of electronically controllable visual indicators and a circular dome, according to an embodiment of the invention.

FIG. 1F and FIG. 1G are front and side view diagrams, respectively, of a computer network peripheral device with a plurality of electronically controllable visual indicators located on the edge of the network peripheral device and a plurality of domes, according to an embodiment of the invention.

DETAILED DESCRIPTION OF THE INVENTION

An embodiment of the invention is directed to providing users of a computer network peripheral device, such as a wireless local area network (WLAN) router, with useful information regarding utilization of a radio component, by the activation of visual indicators, such as light emitting diodes (LEDs), or an electronic display, such as a liquid crystal display (LCD). The information may comprise, for example, information such as selection of respective antennas located inside the WLAN router.

An embodiment of the invention is directed at providing users of the network peripheral device with an indication of which antenna, or antennas were selected by the network peripheral device by activating LED(s) located on the housing of the network peripheral device that correspond to the antenna(s) selected by circuitry in the network peripheral device. Circuitry in the network peripheral device selects an antenna based on factors such as RF radiation pattern incident on each antenna, or location of the antennas with respect to a client device employing a wireless client adapter attempting to communicate with the network peripheral device through one or more of its antennas. Once an antenna or antennas are selected, circuitry in the network peripheral device determines which LED(s) corresponds to the selected antenna(s) and activates the LED(s) for a predetermined period of time, such as for 50 milliseconds. The activated LED(s) inform the user that the antenna(s) corresponding to the activated LEDs have been selected.

Figure 1A:
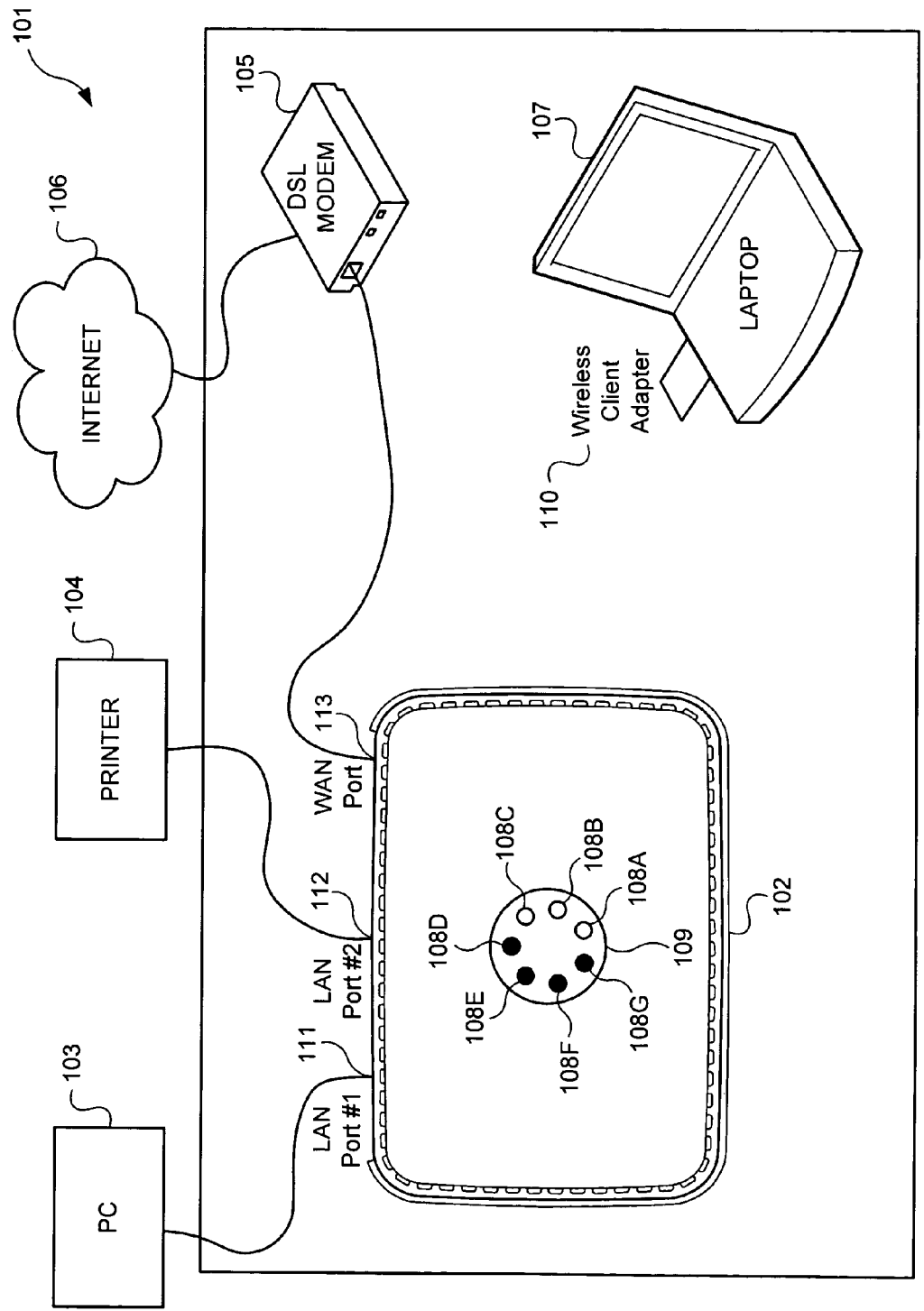
FIG. 1A is a system diagram of an electronic communications system with a computer network peripheral device with a plurality of electronically controllable visual indicators, according to an embodiment of the invention.

FIG. 1A is a system diagram of an electronic communications system with a computer network peripheral device with a plurality of electronically controllable visual indicators, according to an embodiment of the invention. In the network peripheral device shown in FIG. 1A, visual indicators are electronically selected from among a plurality of visual indicators to show useful information regarding utilization of a radio component.

FIG. 1A includes electronic communications system 101, which includes network peripheral device 102, computer system 103, printer 104, interface 105, and client device 107. Network peripheral device 102 includes visual indicators 108A through 108G, and cover 109. Client device 107 includes wireless client adapter 110. Client device 107 includes wireless client adapter 110.

Network peripheral device 102 is coupled to Internet 106 through interface 105. Computer system 103 and printer 104 are coupled to Internet 106 and to each other through network peripheral device 102. Client device 107 is coupled to Internet 106, computer system 103, and printer 104 through wireless client adapter 110 and network peripheral device 102. Network peripheral device 102 has visual indicators 108A-108G and cover 109. Network peripheral device 102 also includes LAN connection ports 111 and 112, and wireless LAN port 113. Visual indicators 108A-108G may comprise light emitting diodes (LEDs), lamps, liquid crystal displays (LCDs), or other visual indicators, according to various embodiments of the invention. In one embodiment of the invention, visual indicators 108A-108G comprise simulated marks, such as dots, squares, or other marks, on a graphic display, such as an LCD. Visual indicators 108A-108G may be arranged in various patterns, such as circular, angular, square, rectangular, linear, a row, a plurality of rows, oval or other pattern, according to various embodiments of the invention.

Network peripheral device 102 may comprise a wireless node or other network peripheral device. Accordingly, the network peripheral device comprises a bridge, an access point, a router, a gateway, a modem, a firewall, a client adapter, and/or other network peripheral device according to various embodiments of the invention. Interface 105 comprises a modem, such as a telephone modem, a DSL modem, or a cable modem, according to various embodiments of the invention. Interface 105 may also comprise a gateway, or a firewall, according to various embodiments of the invention. Computer system 103 and printer 104 are coupled to interface 105 through LAN connection ports 111 and 112, respectively. Network peripheral device 102 is coupled to interface 105 through wireless WAN port 113.

According to an embodiment of the invention, network peripheral device 102 contains circuitry that activates one or more visual indicators from among visual indicators 108A-108G to show useful information regarding utilization of a radio component, such as selection of the device's respective antennas.

According to an embodiment of the invention, network peripheral device 102 contains a form of user interface, such as an on/off switch, capacitive coupling, voice recognition, a software application coupled to circuitry in the network peripheral device, or other user interface, whereby the user may reduce the intensity, or turn off, and on, the visual indicators. Network peripheral device 102 may also include a removable cover that may be fitted to cover 109, such as by snapping on or other mechanism, to cover the brightness of the visual indicators.

FIG. 1B and FIG. 1C are front and side view diagrams, respectively, of a computer network peripheral device with a plurality of electronically controllable visual indicators and a circular dome, according to an embodiment of the invention.

FIG. 1B shows network peripheral device 102, which has visual indicators 108A 108G and a cover, cover 109. Visual indicators 108A-108G are mounted onto network peripheral device 102 and protrude from its surface, according to an embodiment of the invention. Visual indicators 108A-108G may comprise LEDs, or other forms of visual indicators as discussed herein, according to various embodiments of the invention. Visual indicators 108A-108G may be arranged in various patterns. Cover 109 may comprise material such as plastic or other material and may be transparent or translucent and may be clear or have one of various colors such as blue, red, orange, yellow, or other colors. In another embodiment of the invention, cover 109 encloses visual indicators 108A-108G. In various embodiments of the invention, cover 109 may have various shapes, such as rectangular, square, circular, oval, or other shape. FIG. 1B shows cover 109 as a circular dome. The ratio of the diameter of cover 109 to the longest dimension of the device in a planar view, as illustrated in FIG. 1B, may be different values, such as in a range of 0.10 to 0.50, or substantially 0.2, or other ranges in various embodiments of the invention. In another embodiment of the invention, visual indicators 108A-108G are recessed inside network peripheral device 102 and the light of each indicator is brought to cover 109 by light pipes conductors. Light pipes may be placed in between visual indicators 108A-108G and cover 109 for easier manufacturing, or to increase the light to the user, or to focus the light, and may be short to medium length, in various embodiments of the invention. The ratio of the diameter of cover 109 to the light pipe length may be different values such as in a range of 0.10 to 2.0, or substantially 0.3, or other ranges in various embodiments of the invention.

According to an embodiment of the invention, network peripheral device 102 contains circuitry that activates one or more visual indicators from among visual indicators 108A-108G to show useful information regarding utilization of a radio component, such as selection of the antennas in network peripheral device 102. In such an embodiment of the invention, visual indicators 108A through 108G are arranged in a pattern corresponding to an arrangement of a plurality of antennas in network peripheral device 162. FIG. 1B shows visual indicators 108B, 108C, 108E and 108F activated and such activation corresponds to the selection of corresponding antennas in network peripheral device 102. FIG. 1C shows a profile of network peripheral device 102 and cover 109.

Figure 1E:
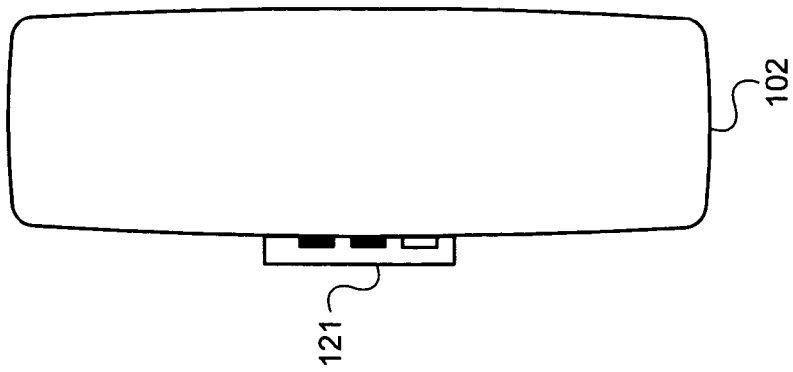
FIG. 1D and FIG. 1E are front and side view diagrams, respectively, of a computer network peripheral device with a plurality of electronically controllable visual indicators and an angular cover, according to an embodiment of the invention.
Figure 1D:
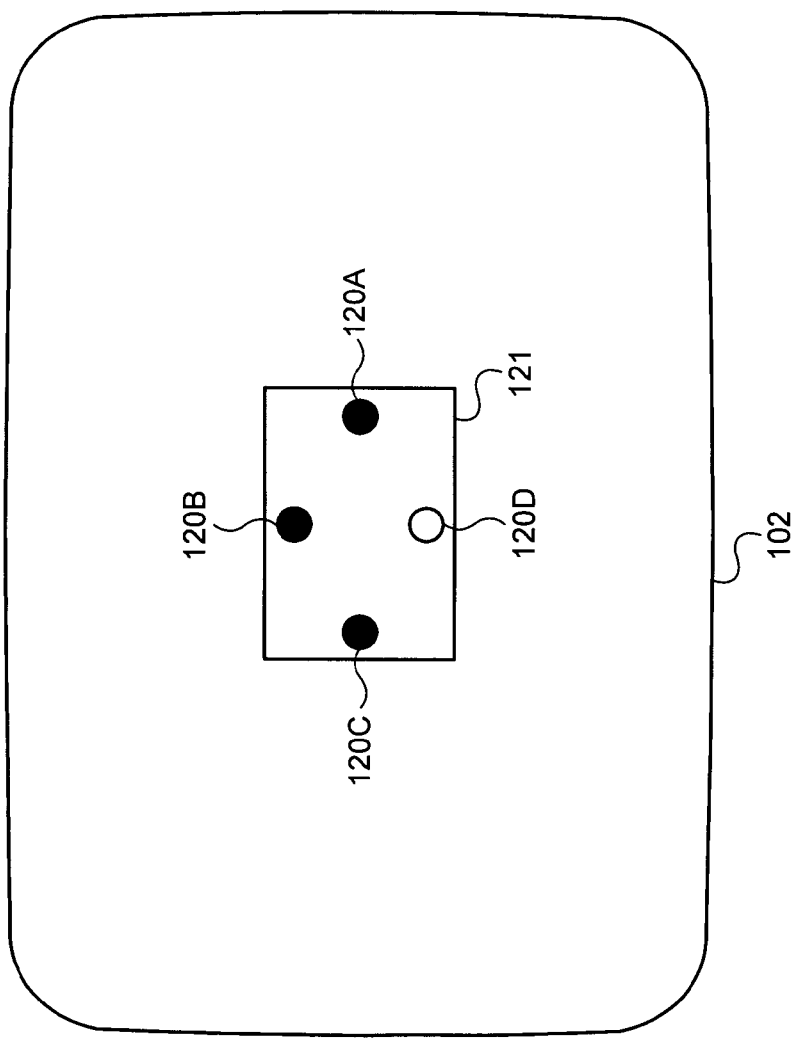

FIG. 1D and FIG. 1E are front and side view diagrams, respectively, of a computer network peripheral device with a plurality of electronically controllable visual indicators and an angular dome, according to an embodiment of the invention.

FIG. 1D shows network peripheral device 102, which has visual indicators 120A-120D and cover 121. Visual indicators 120A-120D are mounted onto network peripheral device 102 and protrude from its surface, according to an embodiment of the invention. Visual indicators 120A-120D may comprise LEDs, or other forms of visual indicators as discussed previously, according to various embodiments of the invention. Visual indicators 120A-120D may be arranged in various patterns. Cover 121 may comprise material such as plastic or other material and may be transparent or translucent and may be clear or have one of various colors such as blue, red, orange, yellow, or other colors. In another embodiment of the invention, cover 121 encloses visual indicators 120A-120D. Note that generally covers of various shapes, other than a circular or ovular dome, may be used in embodiments that are described herein as having a dome. For example, in various embodiments of the invention, cover 121 may have various shapes, such as rectangular, square, circular, oval, or other shape. FIG. 1D shows cover 121 as an angular cover. The ratio of the length of cover 121 to the longest dimension of the device in a planar view, as illustrated in FIG. 1D, may be different values, such as in a range of 0.3 to 0.7, or substantially 0.6, or other ranges, in various embodiments of the invention. Cover 121 may be flush with network peripheral device 102, or may protrude above network peripheral device 102, as shown in FIG. 1E. The protrusion may be up to ⅕ its longest dimension, or even more, in various embodiments of the invention.

According to an embodiment of the invention, network peripheral device 102 contains circuitry that activates one or more visual indicators from among visual indicators 120A-120D to show useful information regarding utilization of a radio component, such as selection of the antennas in network peripheral device 102. In such an embodiment, visual indicators 120A-120D are arranged in a pattern corresponding to an arrangement of a plurality of antennas in network peripheral device 102. FIG. 1D shows visual indicators 120A, 120B and 120C activated and such activation corresponds to the selection of corresponding antennas in network peripheral device 102. FIG. 1E shows a profile of network peripheral device 102 and cover 121.

FIG. 1F and FIG. 1G are the front and side view diagrams, respectively, of a computer network peripheral device with a plurality of electronically controllable visual indicators located on the edge of the network peripheral device and a plurality of domes, according to an embodiment of the invention.

FIG. 1F includes network peripheral device 102, which has visual indicators 130A-130C, cover 131, visual indicators 132A-132C, cover 133, visual indicators 134A-134C, and cover 135. Visual indicators 130A-130C and cover 131 are mounted to the exterior edge of network peripheral device 102 and protrude from its surface, according to an embodiment of the invention. Visual indicators 132A-132C and cover 133 are coupled to an edge of network peripheral device 102. Visual indicators 134A-134C and cover 135 are coupled to an edge of network peripheral device 102. Visual indicators 130A-130C, visual indicators 132A-132C, and visual indicators 134A-134C may comprise LEDs, or other forms of visual indicators as discussed herein, according to various embodiments of the invention. Visual indicators 130A-130C, visual indicators 132A-132C, and visual indicators 134A-134C may be arranged in various patterns, such as in a linear pattern. In one embodiment of the invention, cover 131, cover 133 and cover 135 are each an ovular dome. Cover 131, cover 133, and cover 135 may comprise material such as plastic or other material and may be transparent or translucent and may be clear or have one of various colors such as blue, red, orange, yellow, or other colors. In another embodiment of the invention, cover 131, cover 133, and cover 135 enclose visual indicators 130A-130C, 132A-132C, and 134A-134C, respectively. In various embodiments of the invention, cover 131, cover 133, and cover 135 may alternatively have various other shapes, such as rectangular, square, circular, oval, or other shape. FIG. 1F and FIG. 1G show cover 131, cover 133, and cover 135 as ovular domes. The ratio of the major axis of cover 135 to the shorter dimension of the device in a planar view, as illustrated in FIG. 1F, may be different values, such as in a range of 0.30 to 0.7, or substantially 0.5, or other ranges, according to various embodiments of the invention. Cover 131, cover 133 and cover 135 may be flush with network peripheral device 102, or may protrude above network peripheral device 102, as shown in FIG. 1F and FIG. 1G. The protrusion may be up to ⅕ its longest dimension, or even more, according to various embodiments of the invention.

According to an embodiment of the invention, network peripheral device 102 contains circuitry that activates one or more visual indicators from among visual indicators 130A-130C, visual indicators 132A-132C, and visual indicators 134A-134C to show useful information regarding utilization of a radio component, such as selection of the antennas in network peripheral device 102. In such an embodiment of the invention, visual indicators 130A-130C, visual indicators 132A-132C, and visual indicators 134A-134C are arranged in a pattern corresponding to an arrangement of a plurality of antennas in network peripheral device 102. FIG. 1F shows visual indicators 130A, 130B, 132B, 132C, 134A and 134C activated and such activation corresponds to the selection of corresponding antennas in network peripheral device 102. FIG. 1G shows a profile of network peripheral device 102 and cover 135.

The visual indicators and the domes may be located in different parts of the network peripheral device, according to various embodiments of the invention. For example, in the embodiments of the invention represented in FIGS. 1A-1D, the dome has been located on the top of network peripheral device 102. FIG. 1F shows cover 131 on the left edge of network peripheral device 102, cover 133 on the bottom edge of network peripheral device 102, and cover 135 on the right edge of network peripheral device 102.

Figure 2:
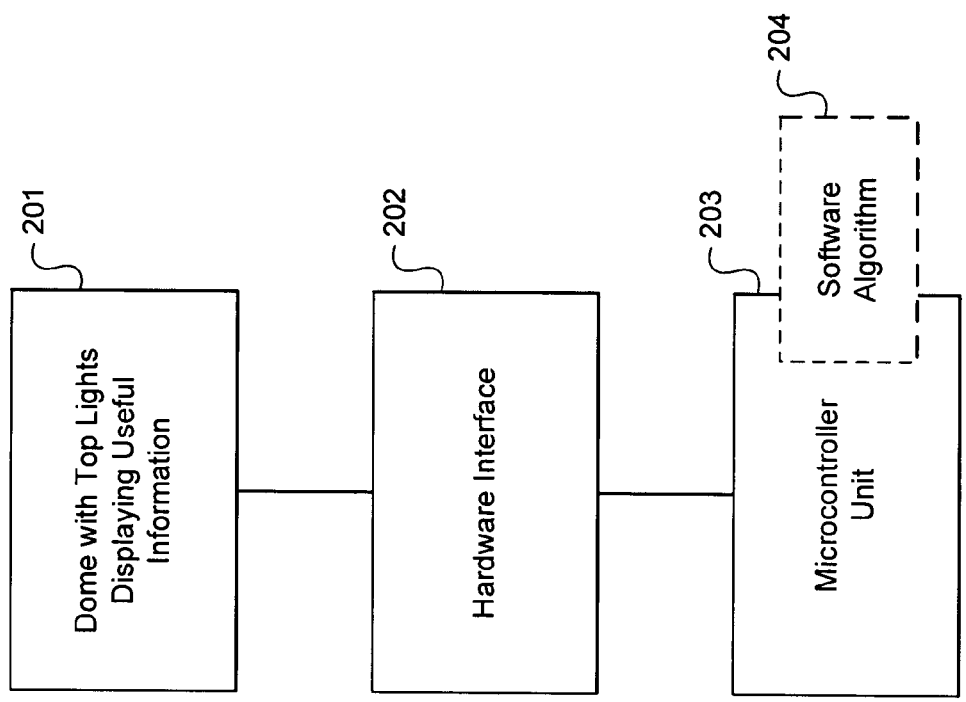
FIG. 2 is a high level block diagram of a computer network peripheral device, according to an embodiment of the invention.

FIG. 2 is a high level block diagram of a computer network peripheral device, according to an embodiment of the invention. The network peripheral device uses a microcontroller unit, which includes some form of software algorithm, and hardware interface to activate visual indicators mounted to the network peripheral device to show useful information regarding utilization of a radio component, such as selection of the antennas in the network peripheral device. FIG. 2 includes dome and visual indicators 201, hardware interface 202, microcontroller unit 203 and software algorithm 204. Dome and visual indicators 201 are coupled to hardware interface 202, which is coupled to microcontroller unit 203. Microcontroller unit 203 includes software algorithm 204.

Software algorithm 204 causes microcontroller unit 203 to receive or process useful information regarding utilization of a radio component. Microcontroller unit 203 may comprise one or more processors, and/or base band electronics and media access control (MAC) logic, in various combinations, according to various embodiments of the invention.

Through hardware interface 202, microcontroller unit 203 actives one or more visual indicators in dome and visual indicators 201 corresponding to the useful information regarding utilization of a radio component. The one or more visual indicators may comprise LEDs, or other forms of visual indicators as discussed previously, according to various embodiments of the invention.

The activation of the visual indicators in dome and visual indicators 201 corresponds to selection of respective antennas located inside the network peripheral device.

Figure 3:
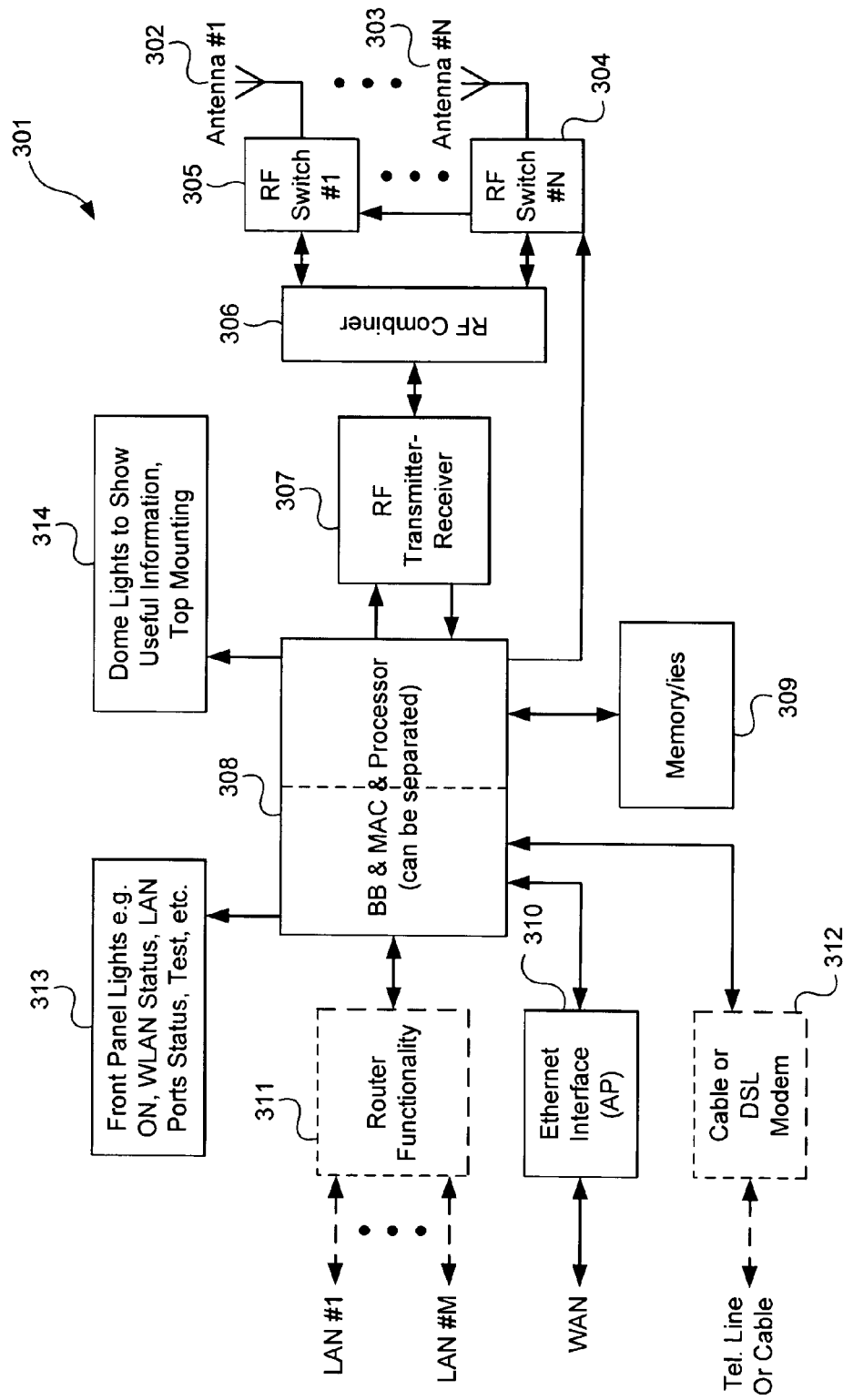
FIG. 3 is a block diagram of a computer network peripheral device that includes a plurality of antennas with respective switches to select them independently, a combiner and one RF transmitter-receiver, according to an embodiment of the invention.

FIG. 3 is a block diagram of a computer network peripheral device that includes a plurality of antennas with respective switches to select them independently, a combiner and one RF transmitter-receiver, according to an embodiment of the invention. In the network peripheral device shown in FIG. 3, a processing block is coupled to circuitry that receives a combined RF signal from a plurality of antennas and activates visual indicators from among a plurality of visual indicators to show useful information regarding utilization of a radio component, such as selection of the antennas in the network peripheral device.

FIG. 3 includes network peripheral device 301, which includes antenna #1 302 through antenna #N 303, RF switch #1 305 through RF switch #N 304, RF combiner 306, RF transmitter-receiver 307, processing block 308, memory 309, interface 310, standard panel lights 313, and electronically controllable visual indicators 314. Additionally network peripheral device 301 may also include router functionality 311 and modem 312. Antennas #1 302 through #N 303 are coupled to RF switches #1 305 through #N 304, respectively, which are each in turn, coupled to RF combiner 306. Various numbers of antennas may be included, such as 1, 2, 3, or other numbers, such that N may equal 0, 1, 2, or other numbers, according to various embodiments of the invention. RF combiner 306 is coupled to RF transmitter-receiver 307, which is also coupled to processing block 308. Processing block 308 is also coupled to memory 309, interface 310, standard panel lights 313, and electronically controllable visual indicators 314. Memory 309 may include any various forms of storage or computer-readable memories such as, but not limited to, volatile memory (random access memory ("RAM")), non-volatile memory (read-only memory ("ROM")), flash memory, electronically erasable programmable read only memory (EEPROM), disk, and/or other storage devices that may include one or more of magnetic and optical storage media random access memory (RAM). Electronically controllable indicators 314 may comprise LEDs, or other forms of visual indicators as discussed previously, according to various embodiments of the invention. Processing block 308 may be also coupled to router functionality 311 and modem 312.

Processing block 308 may include one or more processors, and electronics and logic operable with data received from RF transmitter-receiver 307, in various combinations, according to various embodiments of the invention. The electronics and logic operable with the data received from RF transmitter-receiver 307 may comprise base band electronics and media access control (MAC) logic, respectively. The one or more processors, base band electronics and MAC logic are separated from each other, according to an embodiment of the invention. Various other configurations of the one or more processors, base band electronics and MAC logic located in processing block 308 are possible. For example, in another embodiment of the invention, the base band electronics and MAC logic are located within a single device, such device separated from the one or more processors.

RF switches #1 305 through #N 304 switch antennas #1 302 through #N 303, respectively, on or off. If antennas #1 302 through #N 303 are switched on by RF switches #1 305 through #N 304, respectively, RF combiner 306 is used to combine the RF signals from antennas #1 302 through #N 303 into combined signal data. RF combiner 306 sends the combined signal data to RF transmitter-receiver 307, which then transmits the data to processing block 308. Memory 309 is used by processing block 308 to store and access the data received from RF transmitter-receiver 307, and/or to store program code that controls network peripheral device 301.

Processing block 308 is coupled to an external device, such as a wide area network (WAN), through interface 310. Processing block 308 can be coupled to an external device wirelessly through antennas 302 to 303 by use of RF switches #1 305 through #N 304, RF combiner 306 and RF transmitter-receiver 307. Electronics and logic in processing block 308 activate standard panel lights 313, such as indication of power, wireless LAN status, and LAN port status. Electronics and logic in processing block 308 also activate one or more electronically controllable visual indicators 314, the activation corresponding to useful information regarding utilization of a radio component, such as selection of the antennas in the device. In one embodiment of the invention, processing block 308 is also coupled to an external device, such as a LAN, through router functionality 311. In another embodiment of the invention, processing block 308 is also coupled to the Internet, through modem 312.

Antenna #1 302 is switched on by RF switch #1 305. The RF signal from antenna #1 302 is sent to RF combiner 306. RF combiner 306 combines the RF signal received from antenna #1 302 with any other RF signals corresponding to antenna #N 303. RF combiner sends the combined RF signal to RF transmitter-receiver 307, which then sends the combined RF signal to processing block 308. Processing block 308 uses base band electronics, MAC logic, processor and/or memory 309 to activate visual indicators 314 on network peripheral device 301 to show useful information regarding utilization of a radio component. Processing block 308 also activates standard panel lights 313, and through interface 310, communicates with an external device, such as a computer system. Processing block 308 may connect an external device, such as a computer system, to the Internet through modem 312, or to other devices on a LAN #1 through LAN #N through router functionality 311. Various numbers of LANs may be included, such as 1, 2, 3, or other numbers, such that N may equal 0, 1, 2, or other numbers, according to various embodiments of the invention.

In one embodiment of the invention, the activation of the visual indicators in dome and visual indicators corresponds to selection of antennas from antennas #1 302 through #N 303.

Figure 4:
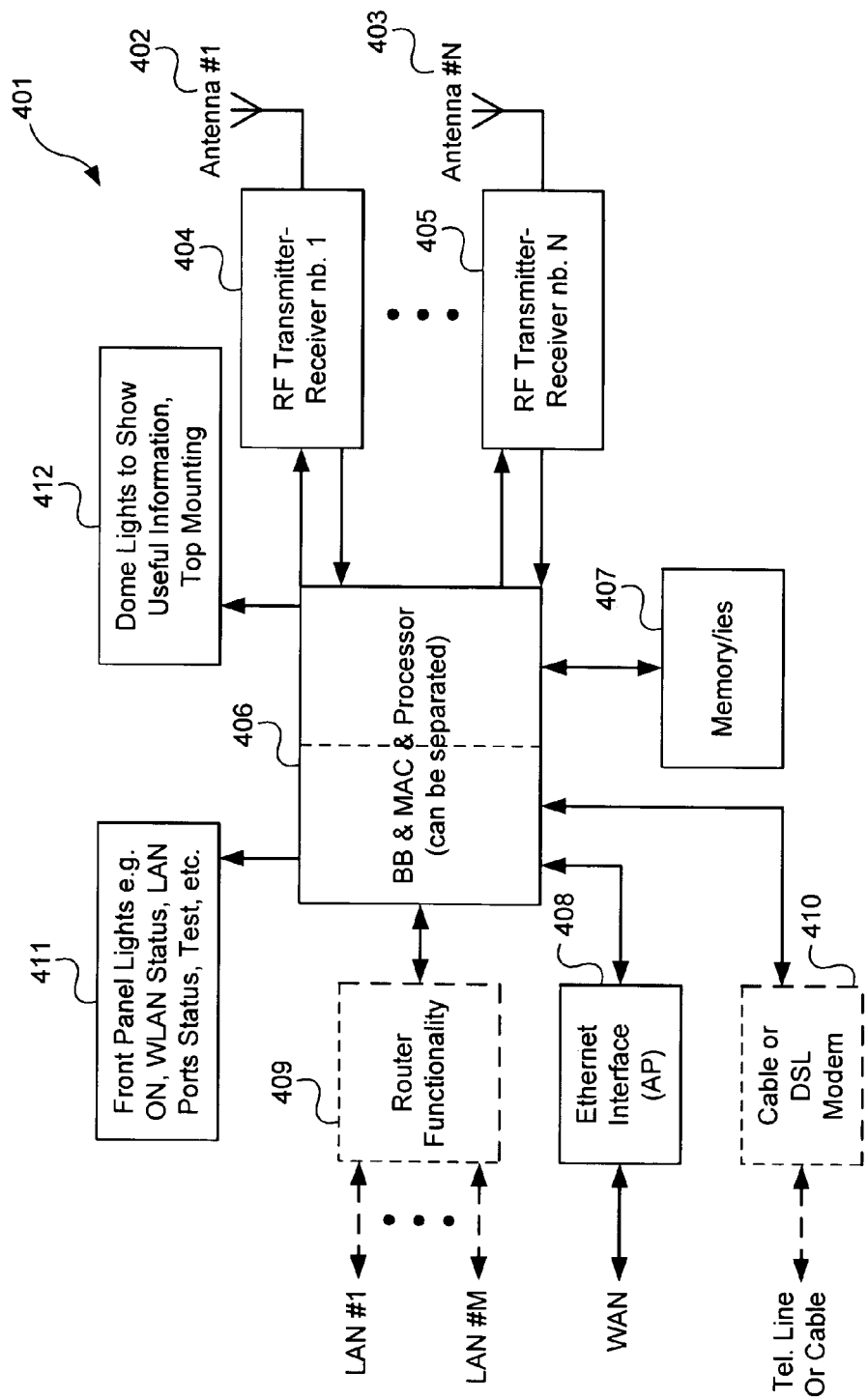
FIG. 4 is a block diagram of a computer network peripheral device that includes a plurality of antennas with respective RF transmitter-receivers capable of multiple inputs-multiple outputs, according to an embodiment of the invention.

FIG. 4 is a block diagram of a computer network peripheral device that includes a plurality of antennas with respective RF transmitter-receivers capable of multiple inputs-multiple outputs, according to an embodiment of the invention. In the network peripheral device shown in FIG. 4, a processing block is coupled to circuitry that receives signals from a plurality of antennas, through a plurality of RF transmitter-receivers corresponding to the antennas, and activates visual indicators from among a plurality of visual indicators to show useful information regarding utilization of a radio component, corresponding to the signals received from the antennas.

FIG. 4 includes network peripheral device 401, which includes each of the following elements, which are arranged similar to such elements of network peripheral device 301 in FIG. 3: antenna #1 402 through antenna #N 403, processing block 406, memory 407, interface 408, standard panel lights 411, electronically controllable visual indicators 412, router functionality 409 and modem 410. Network peripheral device 401 also includes RF transmitter-receiver #1 404 through RF transmitter-receiver #N 405.

Antenna #1 402 through antenna #N 403 are coupled to RF transmitter-receiver #1 404 through RF transmitter-receiver #N 405, respectively, which are each in turn, coupled to processing block 406. Processing block 406 is also coupled to memory 407, interface 408, standard panel lights 411, and electronically controllable visual indicators 412. Processing block 406 may be also coupled to router functionality 409 and modem 410. Memory 407 may include any various forms of storage or computer-readable memories.

RF transmitter-receivers #1 404 through #N 405 are used to transmit RF data corresponding to the RF signals from antennas #1 402 through #N 403, respectively, directly to processing block 406. Processing block 406 uses electronics, logic, and/or processors to activate visual indicators 412 on network peripheral device 401 to show useful information regarding utilization of a radio component. The various functionalities of processing block 406, as they pertain to interface 408, router functionality 409, modem 410, and standard panel lights 411 are similar to the functionalities of processing block 308 with respect to such similar elements discussed in the description corresponding to FIG. 3.

Figure 5:
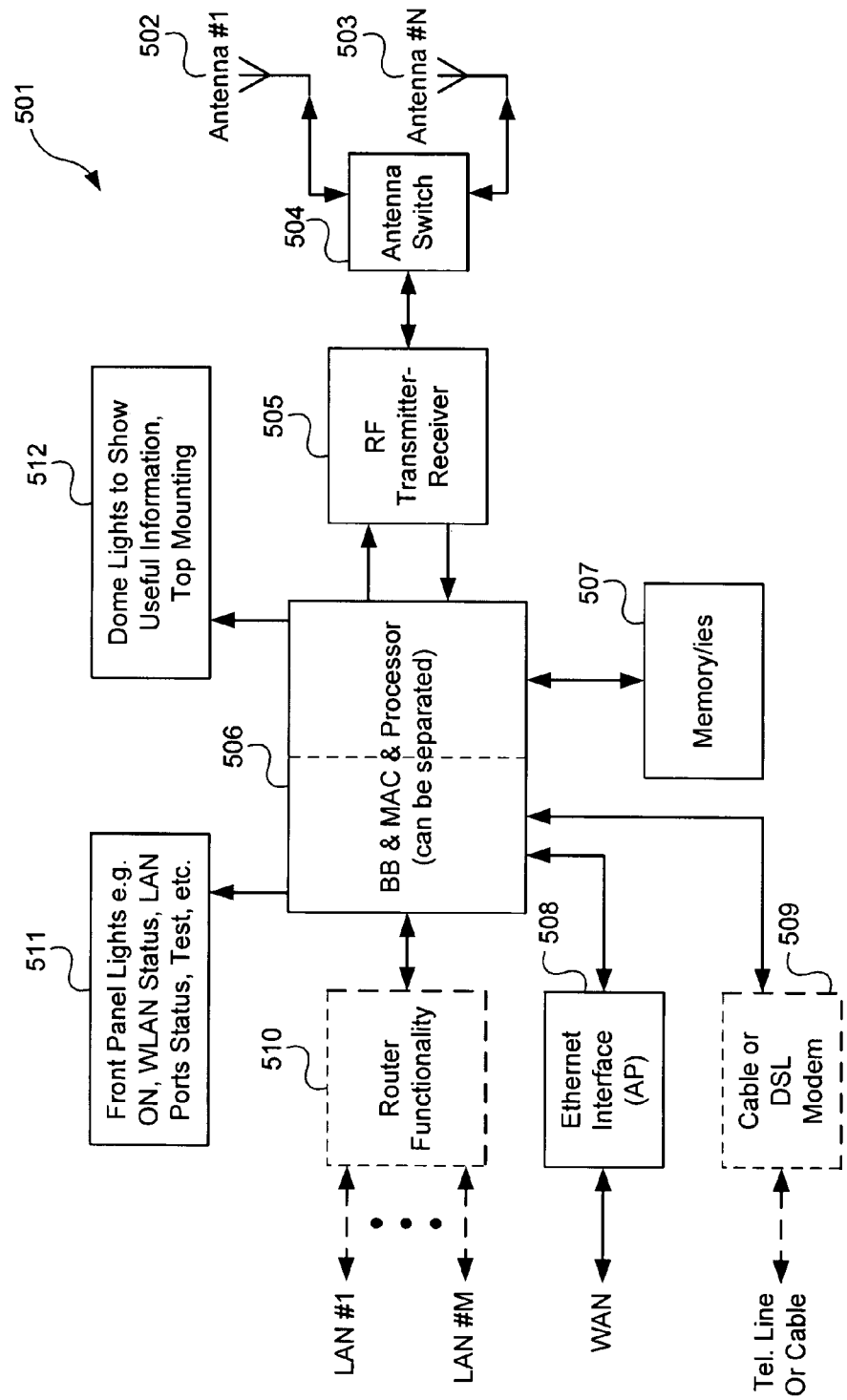
FIG. 5 is a block diagram of a computer network peripheral device that includes a plurality of antennas with a single antenna switch, and a single RF transmitter-receiver, according to an embodiment of the invention.

FIG. 5 is a block diagram of a computer network peripheral device that includes a plurality of antennas with a single antenna switch, and a single RF transmitter-receiver, according to an embodiment of the invention. In the network peripheral device shown in FIG. 5, a processing block is coupled to circuitry that receives signals from a plurality of antennas, through a single transmitter-receiver, and activates visual indicators from among a plurality of visual indicators to show useful information regarding utilization of a radio component, corresponding to the signals received from the antennas.

FIG. 5 includes network peripheral device 501, which includes each of the following elements, which are arranged similar to such elements of network peripheral device 301 in FIG. 3: antenna #1 502 through antenna #N 503, RF transmitter-receiver 505, processing block 506, memory 507, interface 508, standard panel lights 511, electronically controllable visual indicators 512, router functionality 510 and modem 509. Network peripheral device 501 also includes a single antenna switch 504.

Antenna #1 502 through antenna #N 503 are coupled to antenna switch 504. Antenna switch 504 is also coupled to RF transmitter-receiver 505, which is in turn, coupled to processing block 506. Processing block 506 is also coupled to memory 507, interface 508, standard panel lights 511, and electronically controllable visual indicators 512. Processing block 506 may be also coupled to router functionality 510 and modem 509. Memory 507 may include any various forms of storage or computer-readable memories.

Antenna switch 504 switches on one or more of antennas #1 502 through #N 503. The RF signal from the activated antennas is sent to RF transmitter-receiver 505, which then directly transmits the signals to processing block 506. Processing block 506 uses electronics, logic, and/or processors to active visual indicators 512 on network peripheral device 501 to show useful information regarding utilization of a radio component. The various functionalities of processing block 506, as they pertain to interface 508, router functionality 510, modem 509, and standard panel lights 511 are similar to the functionalities of processing block 308 with respect to such similar elements discussed in the description corresponding to FIG. 3.

Figure 6:
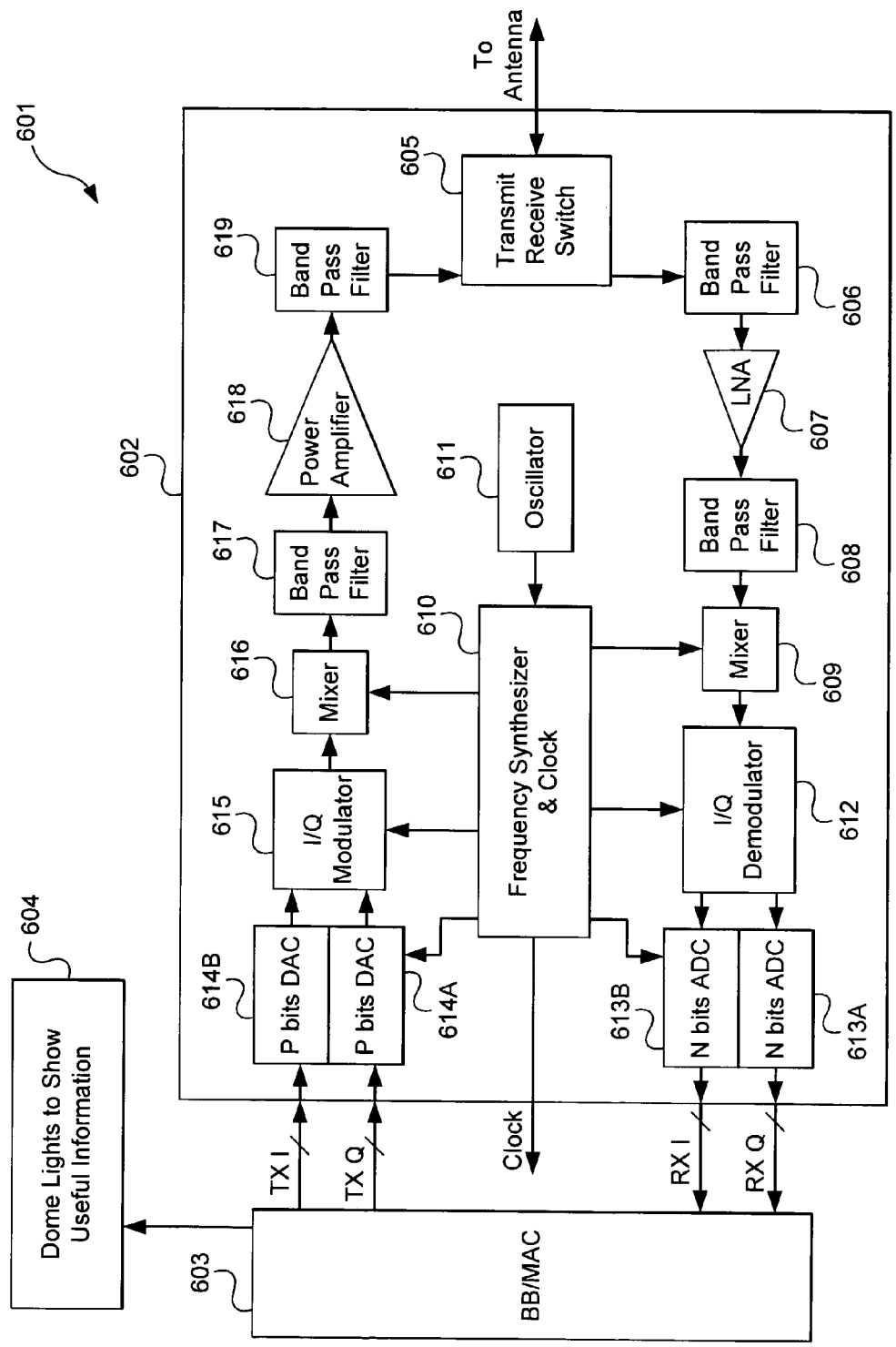
FIG. 6 is a detailed block diagram of an RF transmitter-receiver coupled to a processor, according to an embodiment of the invention.

FIG. 6 is a detailed block diagram of an RF transmitter-receiver coupled to a processor, according to an embodiment of the invention. For example the RF transmitter-receiver shown in detail in FIG. 6, may comprise RF transmitter-receivers 307, 404 through 405, and 505, as described above for FIG. 3, FIG. 4, and FIG. 5, respectively. In the electronic communications system shown in FIG. 6, information is exchanged between the processor block portion of a computer network peripheral device and one or more antennas through an RF transmitter-receiver block. The RF transmitter-receiver block allows the antenna(s) and the processing block to communicate with one another by receiving and transmitting RF signals between the antenna(s) and the processing block. The receiver path of the RF transmitter-receiver block receives radio signals from the antenna(s), filters, demodulates, digitizes, and passes the digitized signal to the processor block. The transmit path of the RF transmitter-receiver receives a signal from the processor block, modulates, mixes, amplifies, and passes the signal to the antenna(s).

FIG. 6 includes electronic communications system 601, which includes RF transmitter-receiver block 602, processing block 603 and dome and visual indicators 604. RF transmitter-receiver block 602 includes switch 605, filter 606, amplifier 607, filter 608, mixer 609, frequency synthesizer and clock 610, oscillator 611, in-phase/quadrature (I/Q) demodulator 612, analog-to-digital converter (ADC) 613A, ADC 613B, digital-to-analog converter (DAC) 614A, DAC 614B, I/Q modulator 615, mixer 616, filter 617, amplifier 618, and filter 619.

RF transmitter-receiver block 602 is coupled to processing block 603, which is coupled to dome and visual indicators 604. Switch 605 is coupled to filter 606, which is coupled to amplifier 607, which is coupled to filter 608, which is coupled to mixer 609. Filter 606 may comprise a band pass filter, amplifier 607 may comprise a low noise amplifier (LNA), and filter 608 may comprise a band pass filter, according to various embodiments of the invention.

Mixer 609 is also coupled to I/Q demodulator 612 and frequency synthesizer and clock 610, which is coupled to oscillator 611. Frequency synthesizer and clock 610 is also coupled to I/Q demodulator 612, which is coupled to ADC 613A and ADC 613B. In one embodiment of the invention, ADC 613A and ADC 613B each comprise an analog-to-digital converter of a plurality of bits.

ADC 613A and ADC 613B are each coupled to the clock in frequency synthesizer and clock 610, and processing block 603. Processing block 603 is also coupled to DAC 614A and DAC 614B. In one embodiment of the invention, DAC 614A and DAC 614B each comprise a digital-to-analog converter of a plurality of bits. DAC 614A and DAC 614B are each coupled to the clock in frequency synthesizer and clock 610, and I/Q modulator 615. I/Q modulator 615 is coupled to mixer 616 and frequency synthesizer and clock 610. Frequency synthesizer and clock 610 is also coupled to mixer 616, which is coupled to filter 617. Filter 617 is also coupled to amplifier 618, which is coupled to filter 619, which is coupled to switch 605. Frequency synthesizer and clock 610 is also coupled to processing block 603.

The following is a description of operation of the receive path of RF transmitter-receiver block 602, according to an embodiment of the invention. The signal from an antenna is passed to processing block 603 through RF transmitter-receiver block 602. Switch 605 receives a signal from one or more antennas and passes the signal to filter 606. Filter 606 selects the signal in the desired frequency band and rejects outband noise or outband signals (interferences) and transmits the filtered signal to amplifier 607. Amplifier 607 amplifies with low additional noise the signal and transmits the amplified signal to filter 608, which filters the noise out of the desired frequency band. Filter 608 transmits the filtered signal to mixer 609, which then uses on its local oscillator (LO) input a constant wave (CW) frequency generated by the synthesizer and clock 610 and oscillator 611, to downconvert the signal to an intermediate frequency and transmit the signal to the I/Q demodulator 612. The I/Q demodulator 612 then uses on its LO input a CW frequency generated by the synthesizer and clock 610 and oscillator 611, to extract and separate the in-phase (I) and quadrature (Q) components of the signal received from mixer 609. I/Q demodulator 612 sends an analog Q signal to ADC 613A, and an analog I signal to ADC 613B. ADC 613A and ADC 613B each convert the Q signal and I signal, respectively, from an analog signal to a digital signal, at a sampling rate given by the clock in synthesizer and clock 610, and send the converted signals to processing block 603. Processing block 603 uses the digital I and Q signals received, and circuitry, to activate visual indicators in dome and indicators 604 to show useful information regarding utilization of a radio component, such selection of antenna(s). The visual indicators may comprise light emitting diodes (LEDs), lamps, liquid crystal displays (LCDs), or other visual indicators, according to various embodiments of the invention.

The following is a description of the transmit path of the RF transmitter-receiver block 602, according to an embodiment of the invention. A signal from processing block 603 is transmitted to an antenna through RF transmitter-receiver block 602. DAC 614A receives a digital Q signal from processing block 603 corresponding to the signal being transmitted. DAC 614B receives a digital I signal from processing block 603 corresponding to the signal being transmitted. DAC 614A and DAC 614B convert the Q signal and I signal, respectively, at a sampling rate given by the clock in synthesizer and clock 610, from a digital signal to an analog signal, and send the converted signals to I/Q modulator 615. I/Q modulator 615 uses on its LO input a CW frequency generated by the synthesizer and clock 610 and oscillator 611 to combine the analog I and Q signals into one signal, which is then transmitted to mixer 616. Mixer 616 uses on its LO input a CW frequency generated by the synthesizer and clock 610 and oscillator 611 to upconvert the signal output by the I/Q modulator 615 into the desired frequency band and to the desired frequency channel. Mixer 616 transmits the mixed signal to filter 617, which filters out any outband mixing products and outband noise. Filter 617 transmits the filtered signal to amplifier 618, which amplifies the signal to a higher level of power, and transmits the amplified signal to filter 619. Filter 619 filters any outband noise frequency products (e.g. harmonics) resulting from the amplification of the signal and transmits the filtered RF signal to switch 605. Switch 605 then sends the signal transmitted by processing block 603 to one or more antennas, in a format readable by the antenna(s).

Figure 7:
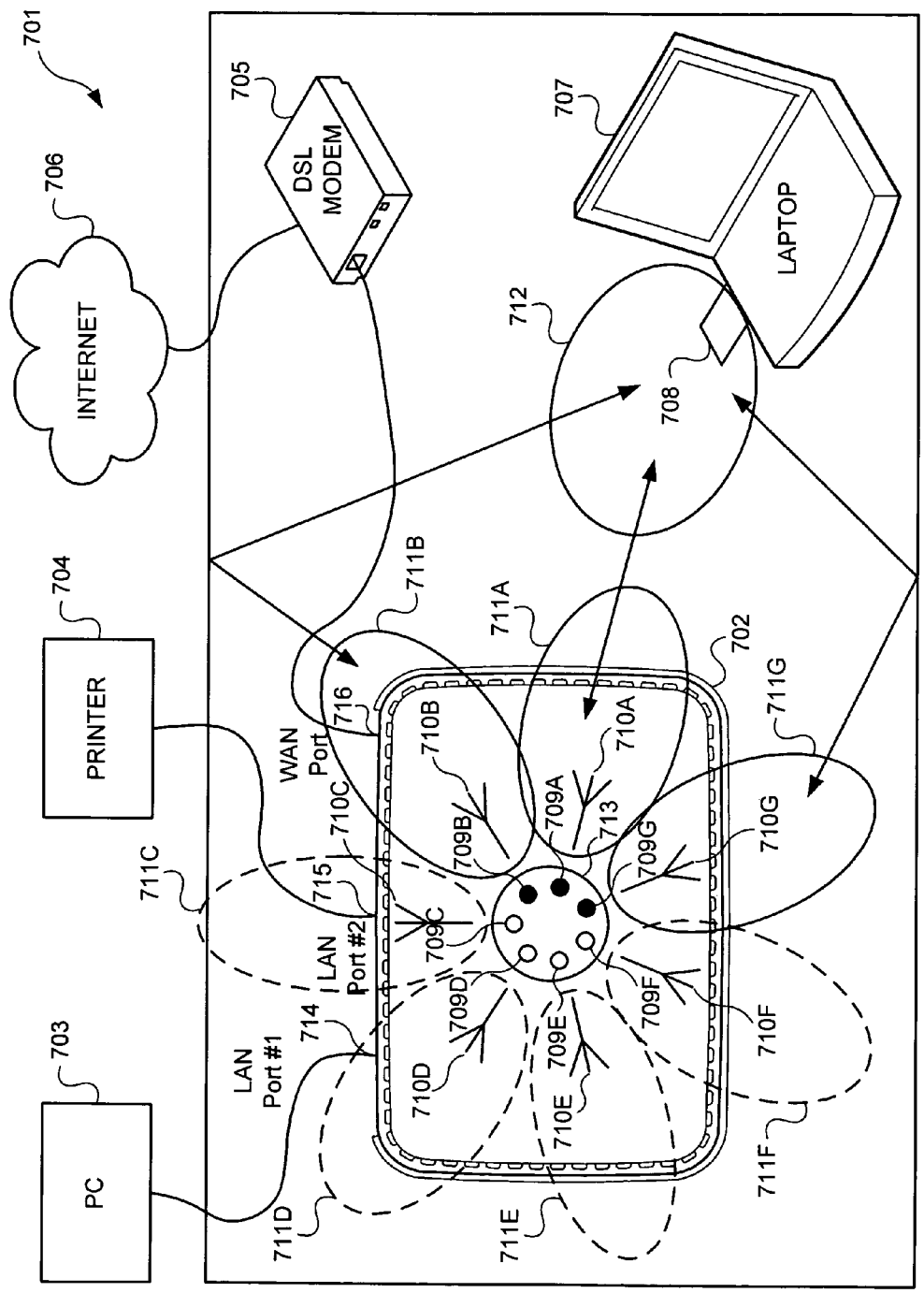
FIG. 7 is a diagram of an electronic communications system showing RF radiation patterns and the activation of one or more visual indicators on the network peripheral device, according to an embodiment of the invention.

FIG. 7 is a diagram of an electronic communications system showing RF radiation patterns and the activation of one or more visual indicators on the network peripheral device, according to an embodiment of the invention. In the electronic communications system shown in FIG. 7, a computer network peripheral device selects one of several antenna(s) from a plurality of antennas to communicate with a client device containing a wireless client adapter, the selection based on factors such as the quality of the signal.

FIG. 7 includes electronic communications system 701, which includes network peripheral device 702, computer system 703, printer 704, interface 705, and client device 707. Also shown is Internet 706. Network peripheral device 702 includes visual indicators 709A-709G, antennas 710A-710G, cover 713, LAN port 714, LAN port 715, and WAN port 716. Client device 707 includes wireless client adapter 708. Also shown in FIG. 7 are radiation patterns 711A-711G, and wireless client adapter radiation pattern 712.

Network peripheral device 702 includes visual indicators 709A-709G, cover 713, LAN port 714, LAN port 715, and WAN port 716. Network peripheral device 702 is coupled to Internet 706 through interface 705. Network peripheral device 702 may comprise a wireless node or other network peripheral device as described herein, according to various embodiments. Computer system 703 and printer 704 are coupled to each other through LAN connection ports 714 and 715, respectively, on network peripheral device 702 and to Internet 706 through network peripheral device 702 and interface 705. Client device 707 is coupled to Internet 706, computer system 703, and printer 704 through wireless client adapter 708 and WAN port 716 on network peripheral device 702. Network peripheral device 702 is also coupled to antennas 710A-710G. Radiation patterns 711A-711G correspond to antennas 710A-710G, respectively, and wireless client adapter radiation pattern 712 corresponds to wireless client adapter 708.

In one embodiment of the invention, network peripheral device 102 provides wireless access and links the client device 107 to Internet 106, printer 104, computer system 103, and to any wireless client devices (WLAN) or other wired client devices (LAN) associated with network peripheral device 102. In one embodiment of the invention, network peripheral device 102 provides wireless access and links other client devices such as 107 to Internet 106, printer 104, computer system 103, and to any wireless client devices (WLAN) or other wired client devices (LAN) associated with network peripheral device 102.

In one embodiment of the invention, client device 707 communicates with one or more of antennas 710A-710G, through client wireless adapter 708, provided the antenna(s) are within the wireless client adapter radiation pattern 712. Network peripheral device 702 may determine the selection of which antenna to use to communicate wireless client adapter 708 based on radiation pattern of antennas 710A-710G, signal strength of the antennas 710A-710G, position of antennas 710A-710G relative to wireless client adapter 708, or other method, alone or in various combinations, according to various embodiments of the invention.

FIG. 7 shows radiation patterns 711A-711G, corresponding to the relative strength of the signals incident on antennas 710A-710G, respectively. The radiation patterns shown in FIG. 7 with dotted outlines indicate relatively weak signals, such as radiation patterns 711C-711F, incident on antennas 710C-710F, respectively. The radiation patterns shown in FIG. 7 with solid outlines indicate relatively strong signals, such as radiation patterns 711A, 711B, and 711GF, incident on antennas 710A, 710B, and 710G, respectively. Therefore, network peripheral device 702 could select one or more of antennas 710A, 710B, and/or 710G to communicate with wireless client adapter 708, according to one embodiment of the invention. FIG. 7 shows network peripheral device 702 selecting antennas 710A, 710B, and 710G to communicate with wireless client adapter 708. Network peripheral device 702 activates visual indicator 709A, 709B, and 709G to indicate to a user that it has selected antennas 710A, 710B, and 710G to communicate with client device 707 through wireless client adapter 708.

Electronic communications system 701 may include one or several client devices, according to various embodiments of the invention. According to various embodiments of the invention, client device 707 may comprise the following items, alone or in combination, and which may be wired or wireless: a laptop, printer, video media player, audio media player, media player, game station, play station, television (TV), high-definition television (HDTV), monitor, access point client (to secondary LANs), satellite receiver, personal video recorder (PVR), digital video recorder (DVR), or other device. Network peripheral device 702 may comprise circuitry that reacts appropriately to communicate with such client devices, according to an embodiment of the invention.

Figure 8:
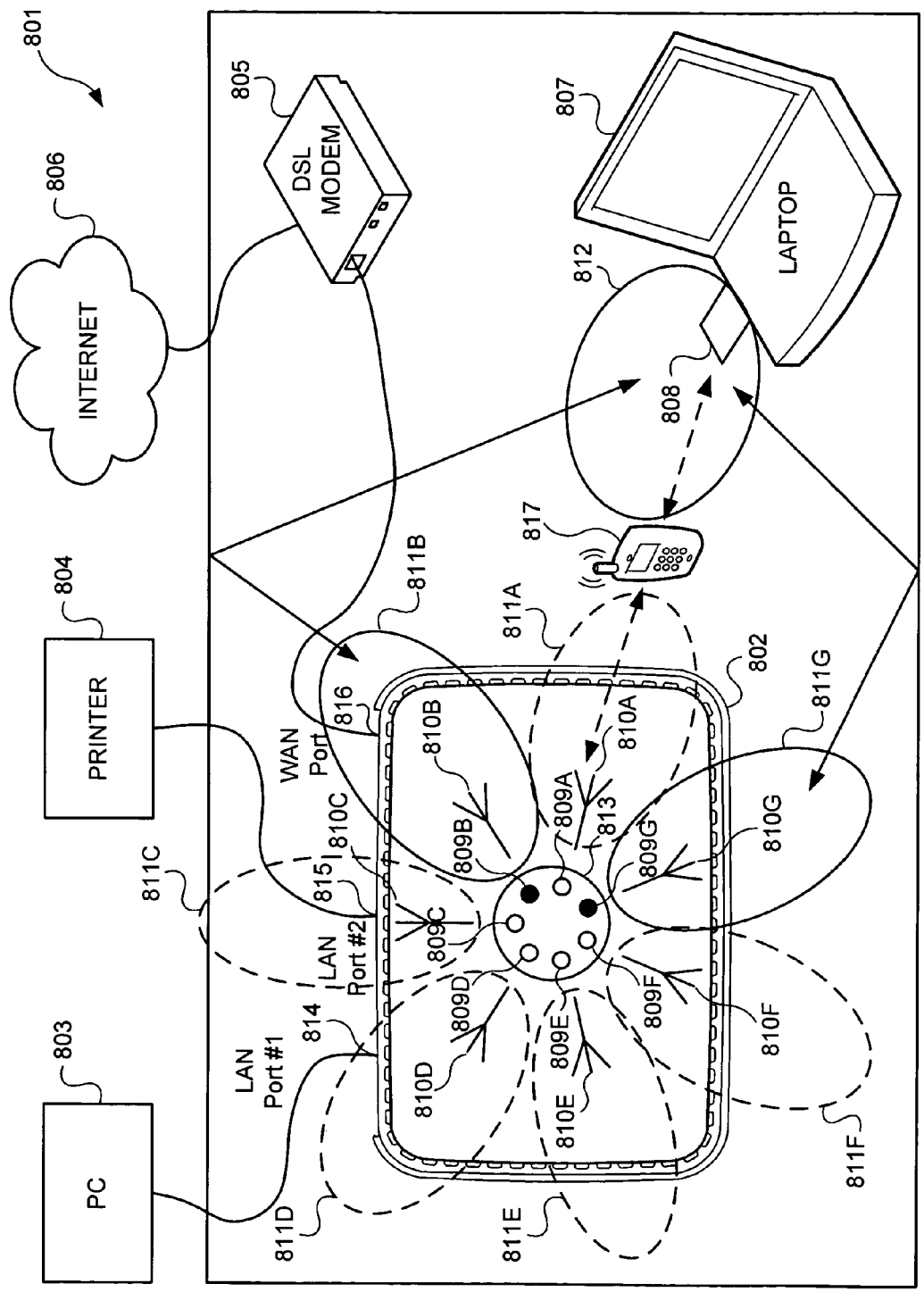
FIG. 8 is a diagram of an electronic communications system including an RF interference device, according to an embodiment of the invention.

FIG. 8 is a diagram of an electronic communications system including an RF interference device, according to an embodiment of the invention. In the electronic communications system shown in FIG. 8, a computer network peripheral device selects one of several antennas from a plurality of antennas to communicate with one or several client devices containing a wireless client adapter, the selection based on factors such as signal quality, which itself may be affected by the selected combination of radiation patterns corresponding to plurality of antennas. The wireless factors influencing the selection of antennas and therefore radiation patterns are sources of RF interference, level of ambient electromagnetic noise and multipath fading. Multipath fading is created by multiple copies of the signal arriving on the network peripheral device, for instance, with different angles, or arriving with different phases and amplitudes. The integration of these factors into an electrical signal can be constructive or destructive. Multipath fading is due to RF propagation indoor when partitions, obstructions, attenuation, diffraction, motions, or other types of interference affect the electrical signal. Multipath fading may manifest itself in space (vary with the position), in time (time variant channel), and in frequency (distorting the frequency band). The use of multiple antennas can be very effective in mitigating the negative effects of multipath fading or in using multipath fading for benefits.

FIG. 8 includes electronic communications system 801, which includes each of the following elements, which are arranged similar to such elements of electronic communications system 701 in FIG. 7: network peripheral device 802, which includes visual indicators 809A-809G, antennas 810A-810G, cover 813, LAN port 814, LAN port 815, and WAN port 816, computer system 803, printer 804, interface 805, client device 807, which includes wireless client adapter 808, radiation patterns 811A-811G, and wireless client adapter radiation pattern 812. FIG. 8 also shows Internet 806 and source of RF interference 817. In one embodiment of the invention, RF interference 817 may be a person using a cellular phone, or other electronic device that interferes with the RF signals from antennas 810A-810G.

As described above, network peripheral device 802 may determine the selection of which antenna to use to communicate wireless client adapter 808 based on signal quality, which itself may be affected by the selected combination of radiation patterns 711A-711G, corresponding to antennas 710A-710G, respectively, or other method, alone or in various combinations, according to various embodiments of the invention. As described above, in the description of FIG. 7, network peripheral device 802 could select antennas 810A, 810B, and 810G to communicate with wireless client adapter 808. However, FIG. 8 shows source of RF interference 817 interfering with the RF signal emitted from antenna 810G. Due to source of RF interference 817 interfering with the signal from antenna 810A, network peripheral device 802 will tend to select another combination of antennas to communicate with client device 807 through wireless client adapter 808, such as 810B, and 810G, as shown in FIG. 8. Network peripheral device 802 activates visual indicators 809B and 809G to indicate to a user that it has selected antennas 810B and 810G to communicate with client device 807 through wireless client adapter 808.

Network peripheral device 802 may select which antenna(s) to use to communicate with client device 807, through wireless client adapted 808, based on an overall link quality and data rate throughput. For example, the receive signal strength intensity (RSSI) is measured for each antenna combination, and the antenna combination leading to the best RSSI is selected, or the TCP digital throughput rate is measured for each antenna combination, and the antenna combination leading to the highest throughput is selected, or the bit error rate (BER) is measured for each antenna combination, and the antenna combination leading to the lowest BER is selected, or the signal to noise ratio (SNR) is measured in base band for each antenna combination, and the antenna combination leading to the highest SNR is selected, or the receive signal after demodulation is measured for each antenna combination, and the antenna combination leading to the highest receive signal after demodulation is selected, or a combination of some or all of the foregoing are measured and used to determine the antenna configuration leading to the best link quality criteria, according to various embodiments of the invention.

Figure 9:
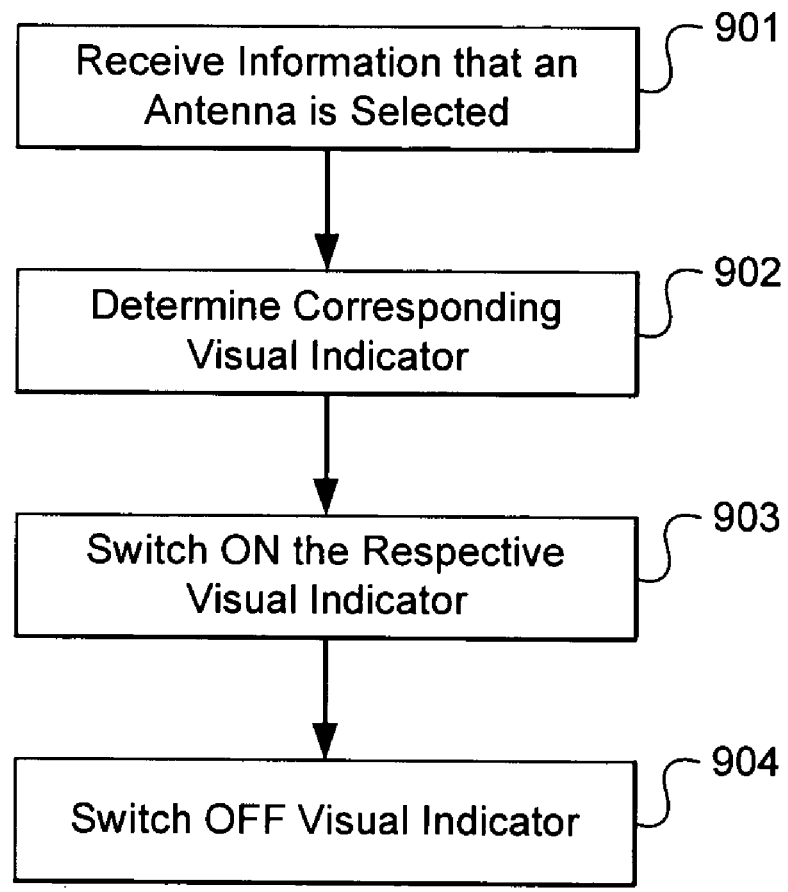
FIG. 9 is a flow diagram of receiving information regarding antenna selection and switching on visual indicators, according to an embodiment of the invention.

FIG. 9 is a flow diagram of receiving information regarding antenna selection and switching on visual indicators, according to an embodiment of the invention. An antenna or antennas, having corresponding visual indicators on a computer network peripheral device in a pattern corresponding to the placement of the antennas, are selected, and the visual indicators corresponding to the selected antennas are activated to show a user which antennas were selected.

Circuitry in a computer network peripheral device receives information that one or more antennas from a plurality of antennas have been selected (block 901). Circuitry in the network peripheral device determines a visual indicator that corresponds to the selected antennas (block 902). Circuitry in the network peripheral device activates one or more visual indicators corresponding to the selected one or more antennas (block 903). The one or more visual indicators may comprise LEDs, or other forms of visual indicators as discussed herein, according to various embodiments of the invention. Circuitry in the network peripheral device de-activates the visual indicators (block 904). The network peripheral device may comprise wireless node or other network peripheral device as described herein.

In one embodiment of the invention, the one or more visual indicators are activated for as long as its corresponding antenna is selected, and when the antenna is de-activated, the corresponding visual indicator is de-activated. Alternatively, the one or more visual indicators are activated for a predetermined time period prior to being de-activated, according to another embodiment of the invention. Different predetermined time periods are possible, for example, the predetermined time period may be in the range of 5 milliseconds to 200 milliseconds or may be substantially 50 milliseconds, according to various embodiments of the invention.

Circuitry in the network peripheral device may perform the steps described in blocks 901 through 904 at a predetermined time frequency. Different predetermined time frequencies are possible, for example, the predetermined time frequency may be in the range of every 5 milliseconds to 200 milliseconds, or may be substantially every 50 milliseconds, according to various embodiments of the invention.

An embodiment of the invention is directed at a network peripheral device. The network peripheral device includes a plurality of antennas, network communications electronics operable with the antennas, a plurality of electronically controllable visual indicators, and circuitry that activates the selected indicators. The network peripheral device may also include networking electronics, router functionality, a modem, a base band processor, a firewall, and/or a media access control (MAC) processor. The visual indicators may comprise light emitting diodes (LEDs). The visual indicators may correspond to a particular antenna. The visual indicators may also be arranged in a pattern corresponding to an arrangement of antennas in the plurality of antennas, or in a substantially circular pattern. The visual indicators may comprise of marks on a display.

An embodiment of the invention is directed at a wireless LAN device for activating indicators corresponding to the selection of respective antennas. The device includes a plurality of antennas, base band electronics that receive and process information from the antennas, media access control (MAC) logic that is coupled to and receives the processed information from the base band electronics, an Ethernet interface coupled to the MAC logic, a plurality of light emitting diodes (LEDs), and circuitry that activates selected LEDs. The baseband electronics and MAC logic may comprise a single processor.

An embodiment of the invention is directed at a method involving switching on and off visual indicators on a network peripheral device (the network peripheral device having a plurality of antennas and network communications electronics operable with the antennas) including receiving information that an antenna has been selected, and determining which indicator among a plurality of electronically controllable visual indicators corresponds to the respective antenna that has been selected. The visual indicator may be switched on for a length of time corresponding to a length of time that the respective antenna is selected, or for a predetermined time period, such as in the range of 5 milliseconds to 200 milliseconds, or substantially 50 milliseconds. Multiple antennas may be selected. Multiple visual indicators corresponding to the selected antennas may be switched on and/or off.

An embodiment of the invention is directed at a computer network peripheral device. The device includes a housing, communications electronics located within the housing, a plurality of antennas, a plurality of electronically controllable visual indicators mounted to the housing, and circuitry that activates the selected indicators. The computer network peripheral may also include a cover covering the visual indicators, which cover may be a square cover, or a dome. The visual indicators may comprise blue light emitting diodes (LEDs). The computer network peripheral may include at least 3 antennas and at least 3 visual indicators.

An embodiment of the invention is directed at a computer network peripheral device. The device includes a housing, communications electronics located within the housing, a plurality of antennas, a plurality of electronically controllable visual indicators mounted to the housing, circuitry that activates selected indicators, and circuitry that de-activates the visual indicators in response to a user action. The computer network peripheral device may also include a switch for receiving the user action, or circuitry to detect the user action through capacitive coupling, or a cover covering the plurality of visual indicators (wherein the user action comprises touching the cover), or a software application (wherein the user action comprises use of the software application to control the circuitry that de-activates the visual indicators).

An embodiment of the invention is directed at a computer network peripheral device. The device includes a housing, communications electronics located within the housing, a plurality of antennas, a plurality of electronically controllable visual indicators arranged in a substantially circular pattern on the housing, and circuitry that activates selected indicators from the plurality of indicators. The computer network peripheral device may also include a cover covering the plurality of visual indicators. The cover may substantially be a circular dome.

An embodiment of the invention is directed at a wireless LAN device. The device includes a housing, a plurality of antennas located within the housing, base band electronics located within the housing (the base band electronics receive and process information from the antennas), media access control (MAC) logic located within the housing, and coupled to and receives the processed information from the base band electronics, an Ethernet coupled to the MAC logic, a plurality of light emitting diodes (LEDs) mounted to the front of the housing (the LEDs arranged in a pattern corresponding to the arrangement of the plurality of antennas), and circuitry that activates selected LEDs. The device may also include a cover covering the plurality of visual indicators. The cover may be a substantially rectangular cover, or a substantially circular dome.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods is not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. Accordingly, the inventors reserve the right to add additional claims after filing the application to pursue such additional claim forms for other aspects of the systems and methods.

What is claimed is:

1. A network peripheral device comprising:
   a plurality of antennas;
   at least a single wireless module that is operable with the plurality of antennas, the single wireless module including
      a single baseband operable with the plurality of antennas;
      networking control module operable with the baseband; and
      a processor;
   a plurality of electronically controllable visual indicators; and
   circuitry that activates and deactivates selected indicators from the plurality of indicators, the activation and deactivation corresponding to selection and deselection of respective antennas from among the plurality of antennas by the single wireless module as the single wireless module continues to operate.

2. The device of claim 1, including networking electronics.
3. The device of claim 1, including router functionality.
4. The device of claim 1, including a modem.
5. The device of claim 1, including a base band processor.
6. The device of claim 1, including a firewall.
7. The device of claim 1, including a media access control (MAC) processor.
8. The device of claim 1, wherein the visual indicators comprise light emitting diodes (LEDs).
9. The device of claim 1, wherein each visual indicator corresponds to a particular antenna among the plurality of antennas.
10. The device of claim 1, wherein the visual indicators are arranged in a pattern corresponding to an arrangement of antennas in the plurality of antennas.
11. The device of claim 1, wherein the visual indicators are arranged in a substantially circular pattern.
12. The device of claim 1, wherein the visual indicators comprise marks on a display.
13. A wireless LAN device comprising:
   a plurality of antennas;
   at least a single wireless module that is operable with the plurality of antennas, the single wireless module including
      base band electronics that receive and process information from the antennas; and
      media access control (MAC) logic that is coupled to and receives the processed information from the base band electronics;
   an Ethernet interface coupled to the MAC logic;
   a plurality of light emitting diodes (LEDs); and
   circuitry that activates selected LEDs from the plurality of LEDs, the activation corresponding to selection of respective antennas for use with the single wireless module from among the plurality of antennas as the single wireless module continues to operate.

14. The wireless LAN device of claim 13, wherein the base band electronics and MAC logic comprise a single processor.
15. The LAN device of claim 13, wherein the LEDs are switched on for a predetermined time period.
16. The LAN device of claim 13, including a dome covering the LEDs.
17. A computer network peripheral device comprising:
   a housing;
   at least a single wireless module that is operable with the plurality of antennas, the single wireless module located within the housing and including
      a single baseband operable with the plurality of antennas;
      networking control module operable with the baseband; and
      a processor;
   a plurality of antennas;
   a plurality of electronically controllable visual indicators mounted to the housing;
   circuitry that activates selected indicators from the plurality of indicators, the activation corresponding to selection of respective antennas used by the single wireless module from among the plurality of antennas as the single wireless module continues to operate; and
   circuitry that de-activates the visual indicators in response to a user action.

18. The device of claim 17, including a switch for receiving the user action.
19. The device of claim 17, including circuitry to detect the user action through capacitive coupling.
20. The device of claim 17, including a cover covering the plurality of visual indicators, and wherein the user action comprises touching the cover.
21. The device of claim 17, including a software application, and wherein the user action comprises use of the software application to control the circuitry that de-activates the visual indicators.
22. The device of claim 17, including a substantially circular dome covering the indicators.

* * * * *